United States Patent
Ohba et al.

(10) Patent No.: US 7,629,020 B2
(45) Date of Patent: Dec. 8, 2009

(54) METHODS FOR PREPARING ELECTROLYTE MEMBRANE AND ELECTROLYTE MEMBRANE/ELECTRODE ASSEMBLY FOR FUEL CELLS

(75) Inventors: Toshio Ohba, Annaka (JP); Shigeru Konishi, Annaka (JP); Mitsuhito Takahashi, Annaka (KP); Norifumi Takahashi, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 729 days.

(21) Appl. No.: 10/963,660

(22) Filed: Oct. 14, 2004

(65) Prior Publication Data

US 2005/0100662 A1  May 12, 2005

(30) Foreign Application Priority Data

Oct. 17, 2003  (JP)  ............................ 2003-357928

(51) Int. Cl.
  *B05D 5/12* (2006.01)
(52) U.S. Cl. .................. 427/115; 427/551; 429/218
(58) Field of Classification Search .................. 427/115
  See application file for complete search history.

(56) References Cited

U.S. PATENT DOCUMENTS 5,846,674 A * 12/1998 Sakai et al. ................. 429/337
5,876,571 A * 3/1999 Buck ...................... 204/157.15
6,716,548 B1 * 4/2004 Kaliaguine et al. ............ 429/33
6,759,157 B1 * 7/2004 Allcock et al. ................ 429/33
2005/0027090 A1 * 2/2005 Zhu et al. ..................... 528/44
2006/0154127 A1  7/2006 Eritate et al.

FOREIGN PATENT DOCUMENTS

| JP | 2001-035509 A | 2/2001 |
| JP | 2003-086021 A | 3/2003 |
| JP | 2003-168447 A | 6/2003 |
| JP | 2003-197218 A | 7/2003 |
| JP | 2004-311315 A | 11/2004 |
| JP | 2005-108604 A | 4/2005 |

OTHER PUBLICATIONS

Viral Mehta, et al."Review and analysis of PEM fuel cell design and maufacturing," Journal of Power Sources; 114 (2003) pp. 32-53.

* cited by examiner

*Primary Examiner*—Michael Kornakov
*Assistant Examiner*—Ryan Schiro
(74) *Attorney, Agent, or Firm*—Birch, Stewart, Kolasch & Birch, LLP

(57) ABSTRACT

An electrolyte membrane for fuel cells is prepared by irradiating with radiation a composition comprising a radiation-curable liquid compound having proton conductivity for curing the liquid compound to form a cured film. The methods of the invention are successful in producing an electrolyte membrane and an electrolyte membrane/electrode assembly for fuel cells while satisfying both the requirements of productivity and cell-related properties including proton conduction and membrane strength.

9 Claims, 1 Drawing Sheet

METHODS FOR PREPARING ELECTROLYTE MEMBRANE AND ELECTROLYTE MEMBRANE/ELECTRODE ASSEMBLY FOR FUEL CELLS

CROSS-REFERENCE TO RELATED APPLICATION

This non-provisional application claims priority under 35 U.S.C. §119(a) on Patent Application No. 2003-357928 filed in Japan on Oct. 17, 2003, the entire contents of which are hereby incorporated by reference.

TECHNICAL FIELD

This invention relates to methods for preparing an electrolyte membrane having improved properties of proton conduction and strength and an electrolyte membrane/electrode assembly for solid polymer electrolyte fuel cells.

BACKGROUND ART

Fuel cells using solid polymer electrolyte (SPE) membranes are expected to find widespread use as power supplies for electric cars and small-size auxiliary power supplies due to a low operating temperature below 100° C. and a high energy density. In such SPE fuel cells, constituent technologies relating to electrolyte membranes, platinum base catalysts, gas diffusion electrodes, and electrolyte membrane/electrode assemblies are important. Among others, the technologies relating to electrolyte membranes and electrolyte membrane/electrode assemblies are most important because they largely govern the performance of fuel cells.

In SPE fuel cells, an electrolyte membrane on its opposite sides is combined with a fuel diffusion electrode and an air diffusion electrode so that the electrolyte membrane and the electrodes form a substantially integral structure. Then the electrolyte membrane not only acts as an electrolyte for conducting protons, but also plays the role of a diaphragm for preventing a fuel (such as hydrogen or methanol) from directly mixing with an oxidant (such as air or oxygen) even under applied pressure.

From the electrolyte aspect, the electrolyte membrane is required to have a high proton transfer velocity, a high ion exchange capacity, and a high and constant water-retaining ability enough to maintain a low electric resistance. The role of a diaphragm requires the electrolyte membrane to have a high dynamic strength, dimensional stability, chemical stability during long-term service, and no extra permeation of hydrogen gas or methanol as the fuel and oxygen gas as the oxidant.

Electrolyte membranes used in early SPE fuel cells were ion exchange membranes of hydrocarbon resins obtained through copolymerization of styrene with divinyl benzene. These electrolyte membranes, however, lacked practical usefulness due to very low durability. Thereafter, perfluorosulfonic acid/PTFE copolymer membranes developed by E.I. duPont and commercially available under the trade mark "Nafion" have been widely used instead.

One problem associated with conventional fluororesin base electrolyte membranes as typified by Nafion is an increased cost because their manufacture starts from the synthesis of monomers and requires a number of steps. This becomes a substantial bar against practical applications. With respect to the thickness of electrolyte membranes, as the membrane becomes thinner, proton conduction becomes easier and hence, fuel cells provide better power generation characteristics. Thin electrolyte membranes, however, can be ruptured when an electrolyte membrane and an electrode are pressed together at elevated temperature to enhance the bond therebetween.

Efforts have been made to develop inexpensive electrolyte membranes that can replace the Nafion and similar membranes. A number of electrolyte membranes under study are described in Viral Mehta, Journal of Power Sources, 114 (2003), pp. 32-53.

However, none of these electrolyte membranes have better characteristics of proton conduction, elongation and strength than Nafion. No electrolyte membrane having better characteristics than Nafion is available up to the present.

SUMMARY OF THE INVENTION

An object of the present invention is to provide a method for preparing electrolyte membranes for fuel cells having improved characteristics of proton conduction, elongation and strength at a high level of productivity. Another object is to provide a method for preparing electrolyte membrane/electrode assemblies for fuel cells, in which an electrolyte membrane and electrodes can be tightly bonded without a need for hot pressing.

The inventor has discovered that by irradiating a liquid proton-conductive compound with radiation for thereby curing the compound to form a cured film, an electrolyte membrane having a high proton conductivity and satisfactory elongation and strength and thus useful for fuel cells can be prepared in an efficient manner. The inventor has also discovered that by applying a liquid proton-conductive compound onto a first electrode having a catalyst borne thereon to form a coating, irradiating the coating with radiation to form a cured film, and disposing a second electrode having a catalyst borne thereon contiguous to the cured film, or by applying a liquid proton-conductive compound onto a first electrode having a catalyst borne thereon to form a coating, disposing a second electrode having a catalyst borne thereon contiguous to the coating, and irradiating the coating with radiation for curing the liquid compound to form a cured film, an electrolyte membrane/electrode assembly for fuel cells in which the electrolyte membrane having a high proton conductivity and satisfactory elongation and strength is tightly bonded to the electrodes without a need for hot pressing can be prepared with industrial advantages.

In a first aspect, the invention provides a method for preparing an electrolyte membrane for fuel cells, comprising the step of irradiating with radiation an electrolyte membrane composition comprising a radiation-curable liquid compound having proton conductivity for curing the liquid compound to form a cured film. The composition may further comprise a proton conduction promoter. Alternatively, the method further includes the step of impregnating the cured film with a proton conduction promoter.

In a second aspect, the invention provides a method for preparing an electrolyte membrane/electrode assembly for fuel cells, comprising the steps of applying an electrolyte membrane composition as described above onto a first electrode having a catalyst borne thereon to form a coating, irradiating the coating with radiation to form a cured film, and disposing a second electrode having a catalyst borne thereon contiguous to the cured film.

In a third aspect, the invention provides a method for preparing an electrolyte membrane/electrode assembly for fuel cells, comprising the steps of applying an electrolyte membrane composition as described above onto a first electrode having a catalyst borne thereon to form a coating, disposing a second electrode having a catalyst borne thereon contiguous to the coating, and irradiating the coating with radiation for curing the liquid compound to form a cured film.

The methods of the invention are successful in producing an electrolyte membrane and an electrolyte membrane/electrode assembly for fuel cells while satisfying both the requirements of productivity and cell-related properties including proton conduction and membrane strength. The electrolyte membrane produced by the method of the invention can have a reduced thickness which leads to effective proton conduction and is thus quite useful in SPE fuel cells and direct methanol-air fuel cells.

BRIEF DESCRIPTION OF THE DRAWING

The only Figure.

DESCRIPTION OF THE PREFERRED EMBODIMENTS

Figure 1:
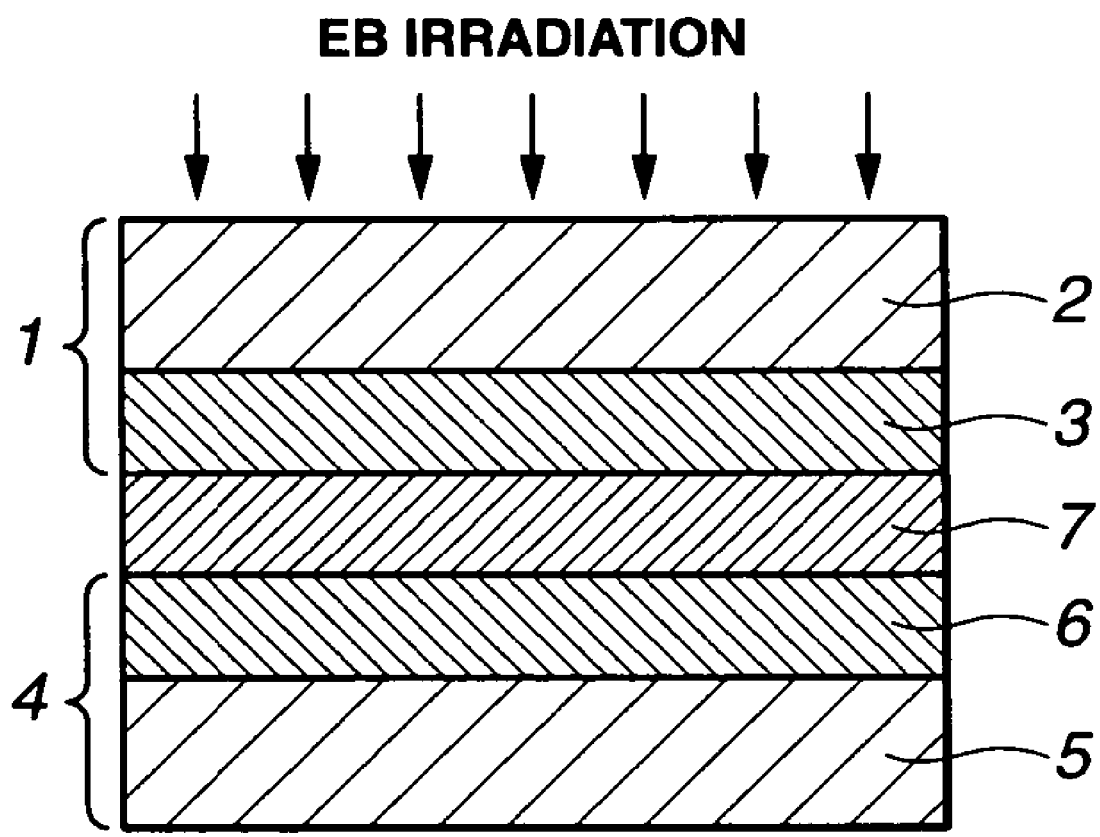
FIG. 1 is a cross-sectional view illustrating one typical method of preparing an electrolyte membrane/electrode assembly according to the invention.

In the first aspect, an electrolyte membrane for fuel cells is prepared by irradiating with radiation an electrolyte membrane composition comprising a radiation-curable liquid compound having proton conductivity for curing the liquid compound to form a cured film.

The radiation-curable liquid compound having proton conductivity is preferably selected from compounds having an ethylenic double bond and a polar group in a molecule, for example, (meth)acrylic acid; sulfonic acid group-containing monomers and alkali metal salts thereof such as styrenesulfonic acid, allylbenzenesulfonic acid, allyloxybenzenesulfonic acid, vinylsulfonic acid, fluorovinylsulfonic acid, perfluoroalkylsulfonic acid fluorovinyl ether, and perfluorovinyl ether sulfonic acid; nitrogen-containing monomers such as N-vinylpyrrolidone, N-vinylcaprolactam, N-vinylacetamide, N-vinylformamide, N,N'-divinylethylene urea, and vinylaniline; and compounds containing polyether units such as nonylphenoxy polyethylene glycol (meth)acrylate, polyethylene glycol mono(meth)acrylate, polyethylene glycol di(meth)acrylate, and urethane (meth)acrylates of polyethylene glycol, polypropylene glycol, polytetramethylene glycol, and polybutylene glycol. The preferred compounds containing polyether units are those in which the molar number of added alkylene glycol is 2 to 20, especially 4 to 10, or those having a weight average molecular weight (Mw) of 160 to 1,600, especially 400 to 800, as measured by the light scattering method.

The radiation-curable liquid compounds may be used alone or in admixture of two or more. They may also be used in the form of a homopolymer of such a compound or a copolymer of more than one compound.

Along with the compound having an ethylenic double bond and a polar group, a compound having an ethylenic double bond, but free of a polar group may be used and mixed. Suitable polar group-free compounds include styrene, t-butylstyrene, n-lauryl acrylate, 2-ethylhexyl acrylate, n-hexyl acrylate, isooctyl acrylate, 2-phenoxyethyl acrylate, and 2-ethoxyethyl acrylate and may be used alone or in admixture thereof. Also acceptable are copolymers of a compound having an ethylenic double bond and a polar group with a compound having an ethylenic double bond, but free of a polar group.

The amount of the compound having an ethylenic double bond, but free of a polar group, when used, is preferably 10 to 200 parts by weight, more preferably 20 to 100 parts by weight per 100 parts by weight of the polar group-containing compound.

Also useful as the radiation-curable liquid compound having proton conductivity are polyurethane (meth)acrylate oligomers. The polyurethane (meth)acrylate oligomers are obtainable through urethane-forming reaction of (a) a polyol component, (b) a polyisocyanate compound, and (c) a (meth)acrylate compound having a hydroxyl group. The polyurethane (meth)acrylate oligomers typically have a number average molecular weight (Mn) of about 200 to about 20,000, preferably about 300 to about 10,000.

(a) Polyol Component

Suitable polyol components include polyether polyols, polyester polyols, polycarbonate polyols and alkyl diols.

Polyether Polyol

Suitable polyether polyols include homopolymers or copolymers of alkylene oxides, typically $C_2$-$C_5$ alkylene oxides such as ethylene oxide, propylene oxide, butylene oxide, tetrahydrofuran and 3-methyltetrahydrofuran; homopolymers or copolymers of the foregoing alkylene oxides using aliphatic $C_{12}$-$C_{40}$ polyols such as 1,2-hydroxystearyl alcohol and hydrogenated dimer diols as the initiator; adducts of bisphenol A with alkylene oxides such as propylene oxide, butylene oxide and tetrahydrofuran; and adducts of hydrogenated bisphenol A with alkylene oxides such as propylene oxide, butylene oxide and tetrahydrofuran. These polyether polyols may be used alone or in admixture of any.

The preferred polyether polyols are homopolymers or copolymers of $C_2$-$C_4$ alkylene oxides, especially $C_3$-$C_4$ alkylene oxides such as propylene oxide and tetrahydrofuran, for example, polyoxypropylene glycol, polytetramethylene ether glycol and propylene oxide-tetrahydrofuran copolymers. In order to reduce the viscosity of resin or suppress the evolution of hydrogen gas upon curing so as to comply with a high speed of tape manufacture, it is preferred to combine the foregoing with polyether polyols having an oxypropylene structure or polypropylene glycol. The polyether polyols may have a Mn selected, for example, in the range of about 200 to about 10,000.

The polyether polyols are commercially available. For example, (1) polyethylene glycol is available under the trade name of PEG600, PEG1000 and PEG2000 from Sanyo Chemical Industries, Ltd.; (2) polyoxypropylene glycol is available under the trade name of Takelac P-21, Takelac P-22 and Takelac P-23 from Takeda Chemical Industries, Ltd.; (3) polytetramethylene ether glycol is available under the trade name of PTG650, PTG850, PTG1000, PTG2000, and PTG4000 from Hodogaya Chemical Co., Ltd.; (4) propylene oxide-ethylene oxide copolymers are available under the trade name of ED-28 from Mitsui Toatsu Chemicals, Inc. and Excenol 510 from Asahi Glass Co., Ltd.; (5) tetrahydrofuran-propylene oxide copolymers are available under the trade name of PPTG1000, PPTG2000 and PPTG4000 from Hodogaya Chemical Co., Ltd.; (6) tetrahydrofuran-ethylene oxide copolymers are available under the trade name of Unisafe DC-1100 and Unisafe DC-1800 from NOF Corp.; (7) adducts of bisphenol A with ethylene oxide are available under the trade name of Uniol DA-400 and Uniol DA-700 from NOF Corp.; and (8) adducts of bisphenol A with propylene oxide are available under the trade name of Uniol DB-400 from NOF Corp.

Polyester Polyol

Suitable polyester polyols include adducts of diols compounds (e.g., ethylene glycol, propylene glycol, diethylene glycol, dipropylene glycol, 1,5-pentaglycol, 3-methyl-1,5- pentanediol, 1,6-hexanediol and neopentyl glycol) with α-caprolactam or β-methyl-δ-valerolactone; reaction products of the foregoing diol compounds with dibasic acids such as succinic acid, adipic acid, phthalic acid, hexahydrophthalic acid and tetrahydrophthalic acid; and reaction products of three components, the foregoing diol compounds, the foregoing dibasic acids and α-caprolactam or β-methyl-δ-valerolactone.

Polycarbonate Polyol

Suitable polycarbonate polyols include reaction products of diol compounds such as 1,6-hexanediol, 3-methyl-1,5-pentanediol, neopentyl glycol, 1,4-butanediol, 1,5-octanediol, 1,4-bis(hydroxymethyl)cyclohexane, 2-methylpropanediol, dipropylene glycol, dibutylene glycol, and bisphenol A or adducts of these diol compounds with 2 to 6 mol of ethylene oxide, with short chain dialkyl carbonates such as dimethyl carbonate and diethyl carbonate.

Also useful are polyester diols which are addition reaction products of these polycarbonate polyols with ethylene oxide, propylene oxide, ε-caprolactam or β-methyl-δ-valerolactone.

The polycarbonate polyols are commercially available, for example, in the trade name of Desmophen 2020E from Sumitomo Bayer Co., Ltd. and DN-980, DN-982 and DN-983 from Nippon Polyurethane Co., Ltd.

Alkyl Diol

Suitable alkyl diols include 1,6-hexanediol, 3-methyl-1,5-pentanediol, neopentyl glycol, 1,4-butanediol, 1,5-octanediol, 1,4-dihydroxycyclohexane, 1,4-bis(hydroxymethyl)cyclohexane, 2-methylpropanediol, tricyclodecane dimethanol, 1,4-bis(hydroxymethyl)benzene and bisphenol A.

Of these polyols, polyether polyols and alkyl diols are preferred because a resin composition having durability and a good balance of physical properties is obtainable.

(b) Polyisocyanate Component

Suitable polyisocyanate components used herein include diisocyanates such as tolylene diisocyanate, 4,4'-diphenylmethane diisocyanate, hydrogenated 4,4'-diphenylmethane diisocyanate, xylylene diisocyanate, hydrogenated xylylene diisocyanate, hexamethylene diisocyanate, isophorone diisocyanate, 1,5-naphthalene diisocyanate, tolidine diisocyanate, m-phenylene diisocyanate, p-phenylene diisocyanate, 2,2,4-trimethylhexamethylene diisocyanate, 2,4,4-trimethylhexamethylene diisocyanate, trans-cyclohexane-1,4-diisocyanate, lysine diisocyanate, tetramethylxylene diisocyanate, 1,4-cyclohexane diisocyanate, 1,3-cyclohexane diisocyanate, 1,4-bis[isocyanatomethyl]cyclohexane, methyl-2,4-cyclohexane diisocyanate, methyl-2,6-cyclohexane diisocyanate, and norbornene diisocyanate (or 1,3-cyclopentene diisocyanate); and polyisocyanates such as lysine ester triisocyanate, 1,6,11-undecane triisocyanate, 1,8-diisocyanato-4-isocyanatomethyloctane, 1,3,6-hexamethylene triisocyanate, bicycloheptane triisocyanate, trimethylhexamethylene diisocyanate, 1,3,5-triisocyanatocyclohexane, 1,3,5-trimethylisocyanatocyclohexane, 2-(3-isocyanatopropyl)-2,5-di(isocyanatomethyl)-bicyclo[2,2,1]heptane, 2-(3-isocyanatopropyl)-2,6-di(isocyanatomethyl)-bicyclo[2,2,1]heptane, 3-(3-isocyanatopropyl)-2,5-di(isocyanatomethyl)-bicyclo[2,2,1]heptane, 5-(2-isocyanatoethyl)-2-isocyanatomethyl-3-(3-isocyanatopropyl)-bicyclo[2,2,1]heptane, 6-(2-isocyanatoethyl)-2-isocyanatomethyl-3-(3-isocyanatopropyl)-bicyclo[2,2,1]heptane, 5-(2-isocyanatoethyl)-2-isocyanatomethyl-2-(3-isocyanatopropyl)-bicyclo[2,2,1]heptane, and 6-(2-isocyanatoethyl)-2-isocyanatomethyl-2-(3-isocyanatopropyl)-bicyclo[2,2,1]heptane. The diisocyanates may be used alone or in admixture of any.

Of these, 2,4-tolylene diisocyanate and isophorone diisocyanate are especially preferred for ease of synthesis reaction and cured film properties.

(c) Hydroxyl-Bearing (Meth)acrylate

Suitable (meth)acrylates having hydroxyl groups used herein include hydroxyalkyl (meth)acrylates, for example, hydroxy-($C_2$-$C_{10}$)alkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, pentanediol mono(meth)acrylate, hexanediol mono(meth)acrylate, and neopentyl glycol mono(meth)acrylate; 2-hydroxy-3-phenyloxypropyl (meth)acrylate, 2-hydroxyalkyl (meth)acryloyl phosphate, 4-hydroxycyclohexyl (meth)acrylate, cyclohexane-1,4-dimethanol mono(meth)acrylate, trimethylol propane di(meth)acrylate, and pentaerythritol tri(meth)acrylate. Also included are products of addition reaction of glycidyl or epoxy group-bearing compounds such as alkyl glycidyl ethers, allyl glycidyl ethers and glycidyl (meth)acrylates with (meth)acrylic acid. These hydroxyl-bearing (meth)acrylates may be used alone or in admixture of any. Preferred hydroxyl-bearing (meth)acrylates are hydroxy-($C_2$-$C_4$)alkyl (meth) acrylates, especially 2-hydroxyethyl (meth)acrylate and 2-hydroxypropyl (meth)acrylate.

It is noted that polyurethane (meth)acrylate oligomers can be prepared by reacting the aforementioned components. The proportion of the respective components constituting the polyurethane (meth)acrylate oligomer is often such that hydroxyl groups in the polyol component constitute about 0.1 to 0.8 mol, preferably about 0.2 to 0.7 mol, and especially about 0.2 to 0.5 mol, and the hydroxyl-bearing (meth)acrylate constitutes about 0.2 to 0.9 mol, preferably 0.3 to 0.8 mol, and especially about 0.5 to 0.8 mol, per mol of isocyanate groups in the polyisocyanate.

It is not critical how to react the aforementioned components to form a polyurethane (meth)acrylate oligomer. In one embodiment, all the components are mixed together and reacted. In another embodiment, the polyisocyanate is reacted with either one of the polyol component and hydroxyl-bearing (meth)acrylate, after which the reaction product is reacted with the remaining component.

The urethane-forming reaction may be effected in the presence of a catalyst which is selected from organometallic urethane-forming catalysts such as stannous octoate, dibutyltin diacetate, dibutyltin dilaurate, cobalt naphthenate, and lead naphthenate, and amine catalysts such as triethylamine, triethylene diamine and diazabicycloundecene as well as other well-known urethane-forming catalysts.

Along with the polyurethane (meth)acrylate oligomer, the compound having an ethylenic double bond, but free of a polar group, described above, may be used or admixed. The amount of the compound having an ethylenic double bond, but free of a polar group, when used, is the same as described above. It is preferred to use 1 to 100 parts by weight, more preferably 10 to 30 parts by weight of the polar group-free compound per 100 parts by weight of the polyurethane (meth) acrylate oligomer as the polar group-bearing compound.

The radiation-curable liquid compound having proton conductivity is not particularly limited as long as it is proton conductive, curable upon exposure to radiation, typically ultraviolet radiation, and liquid. Preferably it has a viscosity at 25° C. of up to 100,000 mPa·s, especially 100 to 10,000 mPa·s. Too high a viscosity may make it difficult to coat thinly and uniformly whereas too low a viscosity may cause cissing on or penetration into substrates.

In the electrolyte membrane composition of the invention, a proton conduction promoter is preferably added to the radiation-curable liquid compound for improving proton conduction. The proton conduction promoter is typically an acid compound capable of releasing protons. Suitable acid compounds include phosphoric acid, sulfuric acid, sulfonic acid, carboxylic acid, boric acid, heteropolyacids, and derivatives thereof, alone or in admixture of any. Of these, heteropolyacids are preferred. The heteropolyacids refers to inorganic oxo-acids. Inter alia, heteropolyacids having Keggin and Dawson structures such as tungstophosphoric acid, molybdophosphoric acid and tungstosilicic acid are preferred. These heteropolyacids are held within the composition by ion conductive polar groups. Herein, such acids or derivatives thereof may be used in admixture of two or more.

In the practice of the invention, the radiation-curable liquid compound may be independently used without admixing the proton conduction promoter. In this embodiment, the radiation-curable liquid compound is cured by irradiating it with radiation, followed by a proton conduction promoting step such as, for example, immersion of the cured film in the proton conduction promoter or a solution thereof or exposure to a vapor of the proton conduction promoter.

An appropriate amount of the proton conduction promoter compounded is 5 to 200 parts by weight, more preferably 10 to 100 parts by weight per 100 parts by weight of the radiation-curable liquid compound. Too less amounts of the proton conduction promoter may achieve less of its effect whereas too much may adversely affect the mechanical properties (such as elongation and strength) of the radiation-cured film.

The proton conduction promoter as typified by heteropolyacid, which usually has water of crystallization, may be added to the radiation-curable liquid compound without adding water. If necessary, water may be suitably added. An ionic liquid may be further added in order to enhance the force of holding the proton conduction promoter within the cured product of the radiation-curable liquid compound, or to enhance proton conduction. Suitable ionic liquids include those of pyridine, imide and aliphatic amine series, for example, butyl pyridinium-$BF_4$, ethylmethylimidazolium-$PF_6$, and hexyltrimethylammonium-$(CF_3SO_2)_2$, but are not limited thereto. An appropriate amount of the ionic liquid added is 1 to 100 parts by weight, more preferably 10 to 50 parts by weight per 100 parts by weight of the radiation-curable liquid compound.

To the electrolyte membrane composition, an inorganic compound such as an oxide, nitride or carbide may be added as a filler for the purpose of holding the proton conduction promoter or preventing penetration of hydrogen or alcohol, water and oxygen in fuel cells. Suitable fillers include boron nitride, silicon carbide and silica. An appropriate amount of the filler compounded is 1 to 100 parts by weight, more preferably 10 to 30 parts by weight per 100 parts by weight of the radiation-curable liquid compound.

If necessary, a photopolymerization initiator may be compounded in the inventive composition. Any of well-known photopolymerization initiators is useful. Exemplary initiators include 1-hydroxycyclohexyl phenyl ketone, 2,2-dimethoxy-2-phenylacetophenone, phenylacetophenone diethyl ketal, alkoxyacetophenones, benzyl methyl ketal, benzophenone and benzophenone derivatives such as 3,3-dimethyl-4-methoxybenzophenone, 4,4-dimethoxybenzophenone and 4,4-diaminobenzophenone, alkyl benzoylbenzoates, bis(4-dialkylaminophenyl) ketones, benzyl and benzyl derivatives such as benzyl methyl ketal, benzoyl and benzoin derivatives such as benzoin butyl methyl ketal, benzoin isopropyl ether, 2-hydroxy-2-methylpropiophenone, thioxanthone derivatives such as 2,4-diethylthioxanthone and 2,4-dichlorothioxanthone, fluorene, 2-methyl-1-[4-(methylthio)phenyl]-2-morpholinopropane-1,2-benzyl-2-dimethylamino-1-(morpholinophenyl)-butanone-1, and phosphine oxide derivatives such as 2,4,6-trimethylbenzoyl diphenyl phosphine oxide and bis(2,6-dimethoxybenzoyl)-2,4,4-trimethylpentyl phosphine oxide. The initiators may be used alone or in admixture of any. An appropriate amount of the initiator compounded is 0.1 to 30 parts by weight, more preferably 1 to 5 parts by weight per 100 parts by weight of the radiation-curable liquid compound.

Examples of the radiation with which the liquid compound having proton conductivity is irradiated include gamma-rays, x-rays, electron beams, ion beams, and ultraviolet radiation. Of these, electron beams and UV radiation are preferred for ease of handling.

Desirably, the electrolyte membrane composition comprising the radiation-curable liquid compound is irradiated with radiation so as to provide an absorbed dose of at least 5 kGy, more desirably 5 to 500 kGy, and most desirably 10 to 100 kGy. Too small an absorbed dose may lead to under-cure whereas too large an absorbed dose may cause decomposition of the liquid compound.

When UV is used as the radiation, an exposure dose of at least 10 $mJ/cm^2$ is desirable. The exposure dose is more desirably 10 to 1,000 $mJ/cm^2$, and most desirably 100 to 500 $mJ/cm^2$. Too small an exposure dose may lead to under-cure whereas too large an exposure dose may be uneconomical due to a waste of energy and a lowering of production efficiency.

The temperature at which radiation is irradiated may be around room temperature. In order to adjust the viscosity of the electrolyte membrane composition comprising the radiation-curable liquid compound so that the composition may be effectively coated, and to produce a coating thereof with a consistent thickness and a consistent surface state, the composition and a substrate (typically, electrode) to be coated with the composition may be controlled to an appropriate temperature. Desirably, the composition and the substrate are controlled to a constant temperature in the range of 25 to 60° C.

The atmosphere in which radiation is irradiated is preferably an inert gas such as nitrogen, helium or argon so that radical polymerization may readily take place. The atmosphere should preferably have an oxygen concentration of up to 500 ppm, more preferably up to 200 ppm.

In the practice of the invention, the electrolyte membrane composition comprising the radiation-curable liquid compound having proton conductivity is applied to a suitable substrate, then irradiated with radiation for curing to form an electrolyte membrane. The curing conditions for the radiation-curable liquid compound are as described above, and the cured film may have any desired thickness, typically in the range of 10 to 200 μm, more preferably 20 to 50 μm.

The electrolyte membrane according to the invention is disposed contiguous to and between first and second electrodes having a catalyst borne thereon to form an electrolyte membrane/electrode assembly for fuel cells. Specifically, the electrolyte membrane/electrode assembly is prepared by either of the following:

method (i) involving applying an electrolyte membrane composition comprising a radiation-curable liquid compound having proton conductivity onto a first electrode having a catalyst borne thereon to form a coating, irradiating the coating with radiation to form a cured film, and disposing a second electrode having a catalyst borne thereon contiguous to the cured film, and method (ii) involving applying an electrolyte membrane composition comprising a radiation-curable liquid compound having proton conductivity onto a first electrode having a catalyst borne thereon to form a coating, disposing a second electrode having a catalyst borne thereon contiguous to the coating, and irradiating the coating with radiation for curing the liquid compound to form a cured film.

Referring to FIG. 1, method (ii) is illustrated. An air electrode 1 includes a catalyst layer 3 coated on a carbon paper 2. Similarly, a fuel electrode 4 includes a catalyst layer 6 coated on a carbon paper 5. A coating 7 of the electrolyte membrane composition (or an electrolyte membrane resulting from curing thereof) is disposed between the electrodes. For example, the assembly is manufactured by forming the coating 7 on the catalyst layer 6 of the fuel electrode 4, placing the air electrode 1 thereon such that the catalyst layer 3 is contiguous to the coating 7, and then applying electron beams (EB) for curing the coating 7, obtaining a cured film or electrolyte membrane.

The electrode having a catalyst borne thereon may be a conventional fuel cell electrode (either fuel electrode or air electrode) on which a catalyst is borne. The construction and material of the electrode may be selected from those well known for fuel cells. The catalyst may also be selected from those well known for fuel cells, for example, platinum base catalysts.

In the above method, a coating of the composition or an electrolyte membrane is joined to electrodes by compression bonding under a force of about 0.05 to 5 kg/cm² using a press or the like. A firm bond is established between the electrolyte membrane and the electrodes without a need for hot pressing.

The electrolyte membrane and the electrolyte membrane/electrode assembly according to the invention are advantageously used in fuel cells. The fuel cell includes a fuel electrode, an air electrode, and a SPE membrane in thin film form disposed therebetween and tightly bonded thereto. A catalyst layer, a fuel diffusion layer and a separator are disposed on both sides of the SPE membrane to construct a fuel cell having improved power generation.

EXAMPLE

Examples of the invention are given below by way of illustration and not by way of limitation.

Example 1

A reactor was charged with 60 g of a nonylphenol EO (4 mole)-modified acrylate, Aronix M-113 (Toagosei Co., Ltd., trade name), 88.6 g of polyethylene glycol having a number average molecular weight of 1,000, and 0.1 g of 2,6-di-tert-butylhydroxytoluene. In a nitrogen stream at 65-70° C., 30.8 g of 2,4-tolylene diisocyanate was added dropwise to the reactor. After the completion of dropwise addition, the reactor was kept at 70° C. for 2 hours, followed by addition of 0.02 g of dibutyltin dilaurate. In dry air, 20.6 g of 2-hydroxyethyl acrylate was added dropwise. The reactor was kept at 70° C. for a further 5 hours, obtaining a polyether urethane acrylate oligomer containing 30% by weight of M-113 (Oligomer A).

50 parts by weight of Oligomer A was mixed with 50 parts by weight of phospho-tungstate n-hydrate (by Wako Junyaku Industry Co., Ltd.) to form a liquid electrolyte membrane composition having a viscosity of 12,000 mPa·s at 25° C.

Next, a 5% isopropyl alcohol solution of Nafion (Aldrich) and carbon having 20 wt % of platinum borne thereon, Vulcan XC72 (E-Tek Inc.) were kneaded to form a paste. Using a wire bar, this catalyst paste was applied onto a carbon paper TGPH090 (Toray Co., Ltd.) so as to give a coating weight of 0.34 mg/cm² of Pt catalyst. The coating was dried on a hot plate at 120° C. for 5 minutes, forming an electrode (fuel electrode). Using an applicator, the liquid composition was applied onto this electrode to form a coating having a thickness of about 30 μm. A similarly constructed electrode (air electrode) was disposed on the coating. The three-layer laminate was pressed at 100 g/cm² and room temperature for one minute, for compression bonding. Using an electron beam-emitting system, the three-layer laminate was irradiated with electron beams in a nitrogen atmosphere having an oxygen concentration of 50 ppm, at an accelerating voltage of 300 kV and an absorbed dose of 50 kGy. The liquid composition effectively cured, and the cured film exhibited a firm bond to both the electrodes.

A similarly cured film was held at 60% relative humidity for 24 hours before it was measured for proton conductivity by an impedance/gain-phase analyzer 1260 (Schlumberger Technologies) under conditions: platinum plate electrodes, test area 1 cm², and 25° C. The proton conductivity was $1.2 \times 10^{-5}$ s/cm.

Comparative Example 1

An ion-exchange membrane having perfluorosulfonate groups, Nafion 112 (trade name, E.I. duPont) was interposed between the fuel and air electrodes which were prepared as in Example 1. The stack was pressed at 100 g/cm² and room temperature for one minute, but the components did not bond together.

Japanese Patent Application No. 2003-357928 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing an electrolyte membrane/electrode assembly for fuel cells, comprising the steps of:
applying an electrolyte membrane composition comprising a radiation-curable liquid compound having proton conductivity onto a first electrode having a catalyst borne thereon to form a coating,
irradiating the coating with radiation to form a cured film, and
disposing a second electrode having a catalyst borne thereon contiguous to said cured film,
said radiation-curable liquid compound having proton conductivity being a polyurethane (meth)acrylate oligomer obtained through a urethane-forming reaction of (a) a polyol component, (b) a polyisocyanate compound, and (c) a (meth)acrylate compound having a hydroxyl group, and having a number average molecular weight of about 200 to about 20,
wherein said polyurethane (meth)acrylate oligomer is obtained by reacting the polyol component (a), the isocyanate compound (b) and the (meth)acrylate compound (c) having a hydroxyl group so that hydroxyl groups in the polyol component constitute about 0.1 to 0.8 mol, and the hydroxyl-bearing (meth)acrylate constitutes about 0.2 to 0.9 mol, per mol of isocyanate groups in the polyisocyanate.

2. A method for preparing an electrolyte membrane/electrode assembly for fuel cells, comprising the steps of:

applying an electrolyte membrane composition comprising a radiation-curable liquid compound having proton conductivity onto a first electrode having a catalyst borne thereon to form a coating, disposing a second electrode having a catalyst borne thereon contiguous to said coating, and irradiating the coating with radiation for curing the liquid compound to form a cured film, said radiation-curable liquid compound having proton conductivity being a polyurethane (meth)acrylate oligomer obtained through a urethane-forming reaction of (a) a polyol component, (b) a polyisocyanate compound, and (c) a (meth)acrylate compound having a hydroxyl group, and having a number average molecular weight of about 200 to about 20,000.

3. The method of claim 1, wherein said composition further comprises a proton conduction promoter.

4. The method of claim 1, further comprising impregnating the cured film with a proton conduction promoter.

5. The method of claim 3, wherein the amount of the proton conduction promoter is 5 to 200 parts by weight per 100 parts by weight of the radiation-curable liquid compound.

6. The method of claim 2, wherein said composition further comprises a proton conduction promoter.

7. The method of claim 2, further comprising impregnating the cured film with a proton conduction promoter.

8. The method of claim 2, wherein said polyurethane (meth)acrylate oligomer is obtained by reacting the polyol component (a), the isocyanate compound (b) and the (meth)acrylate compound (c) having a hydroxyl group so that hydroxyl groups in the polyol component constitute about 0.1 to 0.8 mol, and the hydroxyl-bearing (meth)acrylate constitutes about 0.2 to 0.9 mol, per mol of isocyanate groups in the polyisocyanate.

9. The method of claim 6, wherein the amount of the proton conduction promoter is 5 to 200 parts by weight per 100 parts by weight of the radiation-curable liquid compound.

* * * * *